United States Patent
Singh

(10) Patent No.: US 9,256,045 B2
(45) Date of Patent: Feb. 9, 2016

(54) OPEN LOOP COOLING SYSTEM AND METHOD FOR DOWNHOLE TOOLS

(75) Inventor: Anupam Singh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1031 days.

(21) Appl. No.: 13/502,547

(22) PCT Filed: Nov. 4, 2009

(86) PCT No.: PCT/US2009/063278
§ 371 (c)(1),
(2), (4) Date: Oct. 4, 2012

(87) PCT Pub. No.: WO2011/056171
PCT Pub. Date: May 12, 2011

(65) Prior Publication Data
US 2013/0092379 A1    Apr. 18, 2013

(51) Int. Cl.
G02B 7/04 (2006.01)
G02B 7/02 (2006.01)
H02K 41/035 (2006.01)
E21B 36/00 (2006.01)
G03B 13/34 (2006.01)

(52) U.S. Cl.
CPC ............... *G02B 7/04* (2013.01); *E21B 36/001* (2013.01); *G02B 7/023* (2013.01); *G02B 7/026* (2013.01); *G03B 13/34* (2013.01); *H02K 41/0356* (2013.01)

(58) Field of Classification Search
CPC .................................................. E21B 36/001
See application file for complete search history.

(56) References Cited

U.S. PATENT DOCUMENTS

| | | |
|---|---|---|
| 3,435,629 A | 4/1969 | Hallenburg et al. |
| 3,882,937 A | 5/1975 | Robinson |
| 4,248,298 A | 2/1981 | Lamers et al. |
| 4,559,790 A | 12/1985 | Houston |
| 5,265,677 A | 11/1993 | Schultz |
| 5,701,751 A | 12/1997 | Flores |
| 6,341,498 B1 | 1/2002 | DiFoggio |

(Continued)

FOREIGN PATENT DOCUMENTS

WO    WO-2011056171 A1    5/2011

OTHER PUBLICATIONS

International Application Serial No. PCT/U82009/63278, Response and Amendment filed Sep. 17, 2010 to Written Opinion mailed Aug. 12, 2010, 6 pgs.
International Application Serial No., PCT/US2009/063278, International Preliminary Report on Patentability mailed May 21, 2012, 12 pgs.
International Application Serial No. PCT/US2009/063278, Written Opinion mailed Mar. 16, 2012, 4 pgs.

(Continued)

*Primary Examiner* — David Andrews
(74) *Attorney, Agent, or Firm* — Schwegman Lundberg & Woessner, P.A.; Alan Bryson

(57) ABSTRACT

A downhole tool (100) including an open loop cooling system (110) having a pressurized container (120) disposed within a tool string, and has a refrigerant (122). The cooling system further includes a tank (150) in fluid communication with the pressurized container (120), and a heat exchanger (160) associated with tank (150), where the heat exchanger exchanges heat between the refrigerant (122) and a downhole payload (164). The cooling system further includes a low pressure apparatus that creates a low pressure region proximate the pressurized container. The low pressure apparatus can include a venturi (180). The venturi has a drilling mud passage (188) therethrough, and drilling mud flowing through a convergence (186) creates a low pressure adjacent the tank (150).

21 Claims, 4 Drawing Sheets

(56) References Cited

U.S. PATENT DOCUMENTS

| | | |
|---|---|---|
| 6,769,487 B2 | 8/2004 | Hache |
| 7,347,267 B2 | 3/2008 | Morys et al. |
| 2005/0067005 A1 | 3/2005 | Van Der Spek |
| 2005/0257533 A1 | 11/2005 | Gunawardana et al. |
| 2010/0024451 A1* | 2/2010 | Leabo .............................. 62/122 |

OTHER PUBLICATIONS

International Application Serial No. PCT/US2009/63278, Search Report mailed Aug. 12, 2010, 8 pgs.

International Application Serial No. PCT/US2009/63278, Written Opinion mailed Aug. 12, 2010, 6 pgs.

* cited by examiner

OPEN LOOP COOLING SYSTEM AND METHOD FOR DOWNHOLE TOOLS

RELATED APPLICATIONS

This application is a U.S. National Stage Filing under 35 U.S.C. 371 from International Application No. PCT/US2009/063278, filed on Nov. 4, 2009, and published as WO 2011/056171 A1 on May 2, 2011; which application and publication are incorporated herein by reference in their entirety.

TECHNICAL FIELD

The application relates generally to downhole drilling. In particular, the application relates to a cooling system used during the work with a downhole tool.

BACKGROUND

In order to obtain measurements and information from the downhole environment while drilling, the tool includes electronic devices. Downhole tools must be able to operate near the surface of the earth as well as many thousands of feet below the surface. Environmental temperatures tend to increase with depth during the drilling of the well. As the depth increases, the tools are subjected to a severe operating environment. For instance, downhole temperatures are generally high and may even exceed 200 degrees C. In addition, pressures may exceed 20,000 psi. In addition to the high temperature and pressure, there is also vibration and shock stress associated with operating in the downhole environment, particularly during drilling operations.

The electronic components in the downhole tools also internally generate heat. For example, a typical wireline tool may dissipate over 100 watts of power, and a typical downhole tool on a drill string may dissipate over 10 watts of power. Although there is electrical power dissipated by a drill string tool, the heat from the drilling environment itself still makes internal heat dissipation a problem. The internally dissipated heat must be removed from the electronic components or thermal failure will occur.

BRIEF DESCRIPTION OF THE DRAWINGS

The embodiments are provided by way of example and not limitation in the figures of the accompanying drawings, in which like references indicate similar elements and in which.

DETAILED DESCRIPTION

Methods, apparatus and systems for cooling components of a downhole tool using an open loop system are described. The open loop cooling system includes a refrigerant stored in a container which is continually consumed over the span of cooling time needed. In the following description, numerous specific details are set forth. However, it is understood that embodiments of the invention may be practiced without these specific details. In other instances, well-known circuits, structures and techniques have not been shown in detail in order not to obscure the understanding of this description. Some embodiments may be used in Measurement While Drilling (MWD), Logging While Drilling (LWD) and wireline operations.

Figure 1:
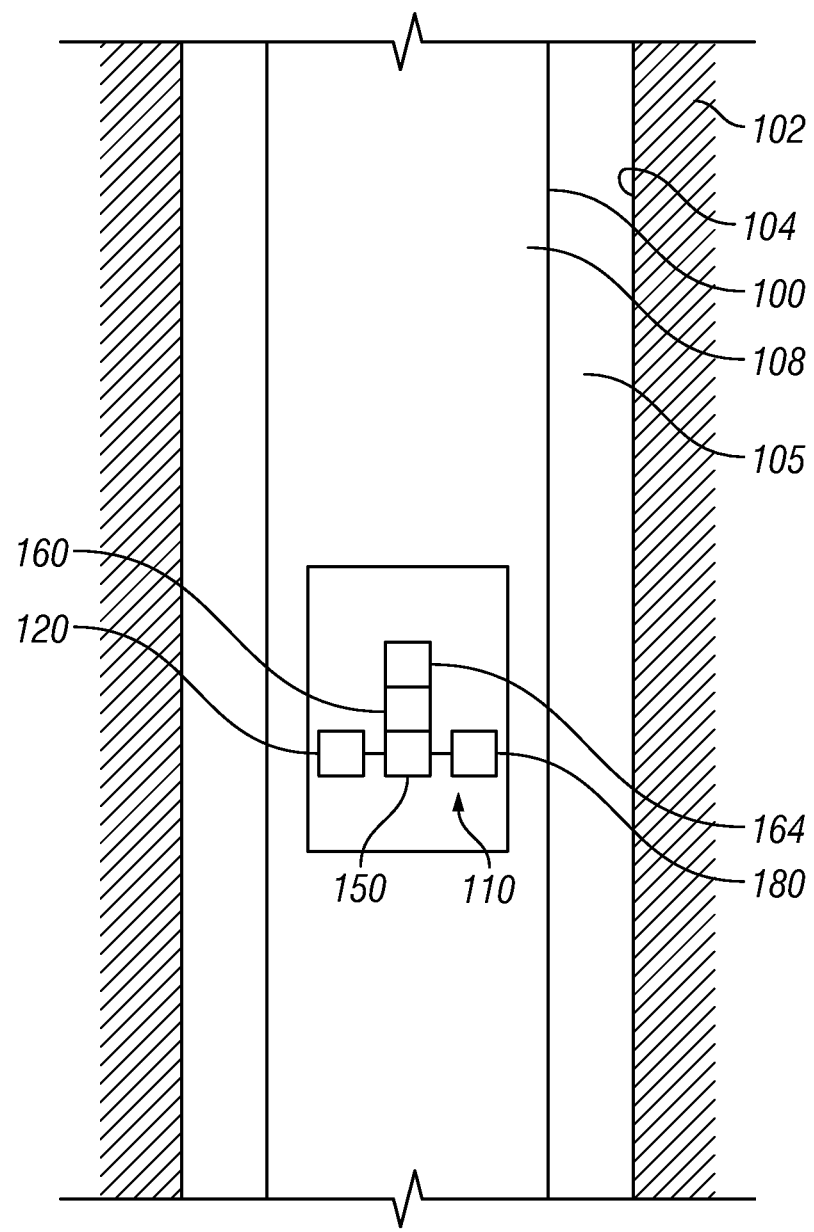
FIG. 1 illustrates a portion of a downhole tool a having cooling system, according to example embodiments.

FIG. 1 illustrates a downhole tool 100 having a cooling system 110, according to example embodiments. As shown, the downhole tool 100 is within a borehole 104 that is drilled into the formation 102. The cooling system 110 can be used with a drill string, a downhole wireline tool, a permanently installed downhole tool, or a temporary well testing tool, as further discussed below. From the Earth's surface to downhole, a drilling fluid may pass through a downhole tool string (including the downhole tool 104) and out an end of the string. The drilling fluid may then return to the Earth's surface through an annulus 105.

The cooling system 110 lowers temperatures of electronic components encloses in the downhole tool to a temperatures lower than the downhole ambient temperature. In an example, the cooling system 110 lowers temperature of a payload, such as a thermal component mounted on a board in the downhole tool 100. In an option, the thermal component includes, but is not limited to, heat-dissipating components, heat-generating components, and/or heat-sensitive components. An example of a thermal component is an integrated circuit, e.g., a computer chip, or other electrical or mechanical device that is heat-sensitive, or whose performance is deteriorated by high temperature operation, or a device that generates heat. The cooling system 110 is installed within a cavity of the downhole tool 100.

Figure 2:
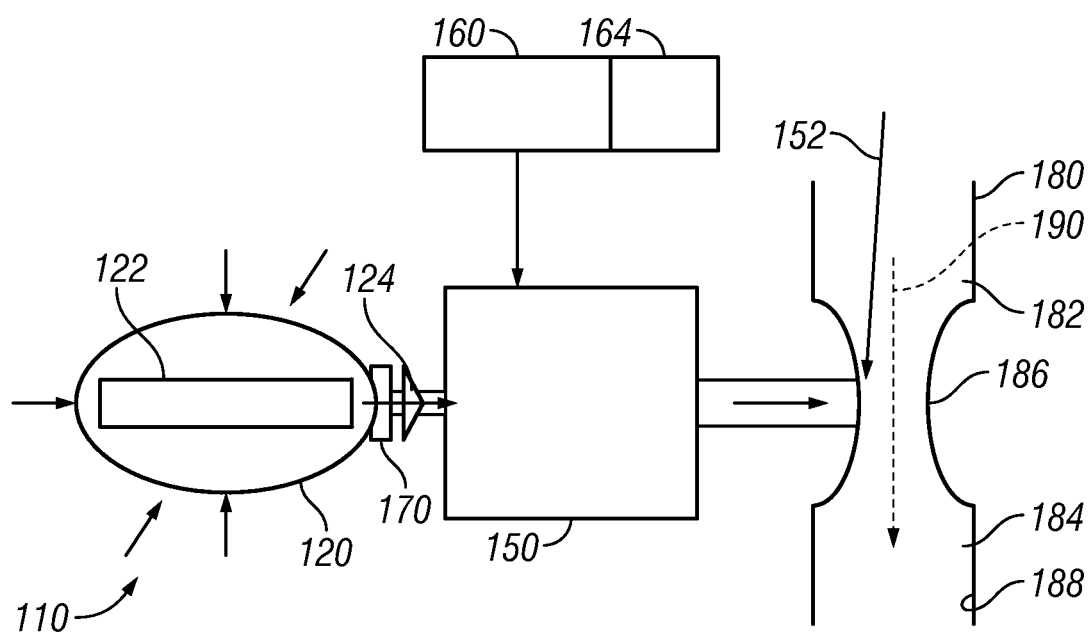
FIG. 2 illustrates a diagram of the system according to other example embodiments.

Referring to FIG. 2, the cooling system 110 includes a pressured container 120 that has refrigerant 122, such as, but not limited to, water. Water is non-toxic and can be released into the drilling mud, and has a high specific heat of vaporization. For instance, about 3.5 gallons of water can provide continuous cooling power of about 20 W for 14 days. In another option, the refrigerant is isopropyl alcohol. The pressurized container 120 is, in an option, capable of withstanding the extreme downhole temperatures and shock conditions. For example, the pressurized container 120 can be a stainless steel container. In an option, the contents of pressurized container 120 are placed under pressure at the Earth's surface, prior to dropping the tool down the borehole. In another option, the pressure of the pressurized container 120 is created and/or maintained by downhole pressure, or by the flow of drilling mud. For instance, in an option, the pressurized container 120 includes a cylinder with a piston therein that is actuated by the downhole pressure. In another option, a compressible spring can be used. In a further option, the increased downhole temperature pressurizes the container 120, for example when the container has a fixed volume. The refrigerant 190 continually exchanges heat with the ambient downhole temperature, for example, through the body of the container 120. In an option, the pressurized container 120 includes one or more orifices, which allows for the refrigerant to exit the container 120 to a tank 150. The refrigerant can be released at specific rates using a regulator, or with orifices of different sizes.

The cooling system 110 further includes a tank 150 in fluid communication with the pressurized container 120. The tank 150 allows for the refrigerant to expand and cool the payload 160, as further described herein. The tank 150 can be in various forms. For example, the tank 150 can be any expansion chamber, such as, but not limited to, tubes of the heat exchanger.

The cooling system 110 further includes a heat exchanger 160 thermally coupled with the thermal component or payload 164. In an embodiment, the heat exchanger 160 is thermally coupled with the thermal component or payload 164 via a conductive path to the thermal component or payload 164. In another option, the heat exchanger 160 may be thermally coupled with the thermal component 12 by radiation or convection. The heat exchanger 160 may be any appropriate type of heat exchanger, e.g., a conduction heat exchanger that uses heat conduction to transfer the heat through solids. The heat exchanger 160 may also comprise multiple layers of the same or different materials.

The heat exchanger 160 and the tank 150 are thermally coupled via a thermal conduit system. The thermal conduit system includes a thermally conductive material for transferring heat from the heat exchanger 160 to the tank 150. The temperature gradient between payload 164 and the tank 150 is such that the tank 150 absorbs the heat from the payload 164 through the heat exchanger 160 and the thermal conduit system. The cooling system 110 removes enough heat to maintain the payload 164 at or below downhole ambient temperature. Absorbing heat discretely from the thermal component thus extends the useful life of the thermal component of the payload.

The tank 150 is in fluid communication with the pressurized container 120. In an option, an actuator 170 is at an exit of the pressurized container 120, and controls the timing and the amount of refrigerant that is released to the tank 150. In an option, the actuator is actuated by an electrical circuit that activates a valve, such as a check valve 124. In another option, it includes a static system. For instance, a plug that melts at a preset temperature can be used. In another option, a bimetallic strip can be used, and the strip would coil based on the temperature of the devices which need to be cooled. In another option, the temperature of the electronics could be sensed, and electronics can be used to turn on or off the cooling system or to regulate the size of the orifice.

The tank 150 is further situated adjacent a venturi 180. The venturi 180 is located proximate to the pressurized container 120, and has a drilling mud passage 188 therethrough. The drilling mud passage 188 has a first portion 182 and a second portion 184, and a convergence 186 therebetween. Drilling mud 190 flows through the venturi 180 from the first portion 182, through the convergence 186, and through the second portion 184. The venturi 180, in an option, includes a sintered tungsten carbide nozzle and throat and a shallow angle can be created to reduce the impingement from the drilling mud. In another embodiment, the venturi 180 includes geometry which causes the flow of drilling mud to separate from the flow walls.

Due to the geometry of the venturi 180, mud flowing therethough will experience an increase in velocity, and a decrease in pressure. The low pressure point creates low pressure near the tank 150. Refrigerant 122 is kept under higher pressure in the container 120, and is released to the tank 150, where the refrigerant 122 gets flashed to a lower pressure, and the temperature of the refrigerant 122 drops below the downhole ambient temperature. The temperature drop can be used to cool a payload 164 via the heat exchanger 160, as discussed above. The low pressure fluid can then be released in the drilling mud or piped up to the Earth's surface.

During a method of cooling a downhole tool, the method includes pressurizing a container having refrigerant, such as water, therein, disposing a pressurized container within a downhole tool string, and disposing the downhole tool string downhole in a wellbore. In an option, the container is pressurized prior to disposing the downhole tool string downhole in the wellbore, such as pre-pressurized at the Earth's surface. In a further option, creating or maintaining the pressure does not necessarily depend on downhole pressure or flow. Once the downhole tool is disposed downhole, the pressure of the pressurized container can be created or maintained, and refrigerant is maintained at the ambient temperature. The pressure can be maintained or provided using the downhole pressure, drilling mud flow, electrically (e.g. pump), mechanically (e.g. biasing member), or combinations thereof. For instance, a piston or spring or bellows can be displaced using downhole pressure and/or drilling mud flow. In another option, the pressure can be maintained by rotating a turbine with downhole mud flow.

The method further includes decreasing pressure of the drilling mud near the pressurized container within the downhole tool including flowing drilling mud through passage of a venturi. For instance, the drilling mud flows through a convergence, which increases the velocity of the fluid, and lowers the pressure of the drilling fluid. The refrigerant is flashed to a lower pressure due to a lower pressure from the drilling fluid, where the temperature of the refrigerant drops below the downhole ambient temperature, a payload of the downhole tool string is cooled to a temperature lower than the downhole ambient temperature. The low pressure refrigerant can be released into the drilling mud, or can be piped to an upper surface portion of the wellbore. In another option, the refrigerant can be collected in a tank and brought back to the surface.

In a further option, a regulator can be used to release the refrigerant from the pressurized container upon occurrence of an event. For instance, an operator can monitor certain conditions, and operate the regulator from the Earth's surface. Or the regulator can be operated when the temperature of the refrigerant is at or greater than the downhole ambient temperature.

Figure 3:
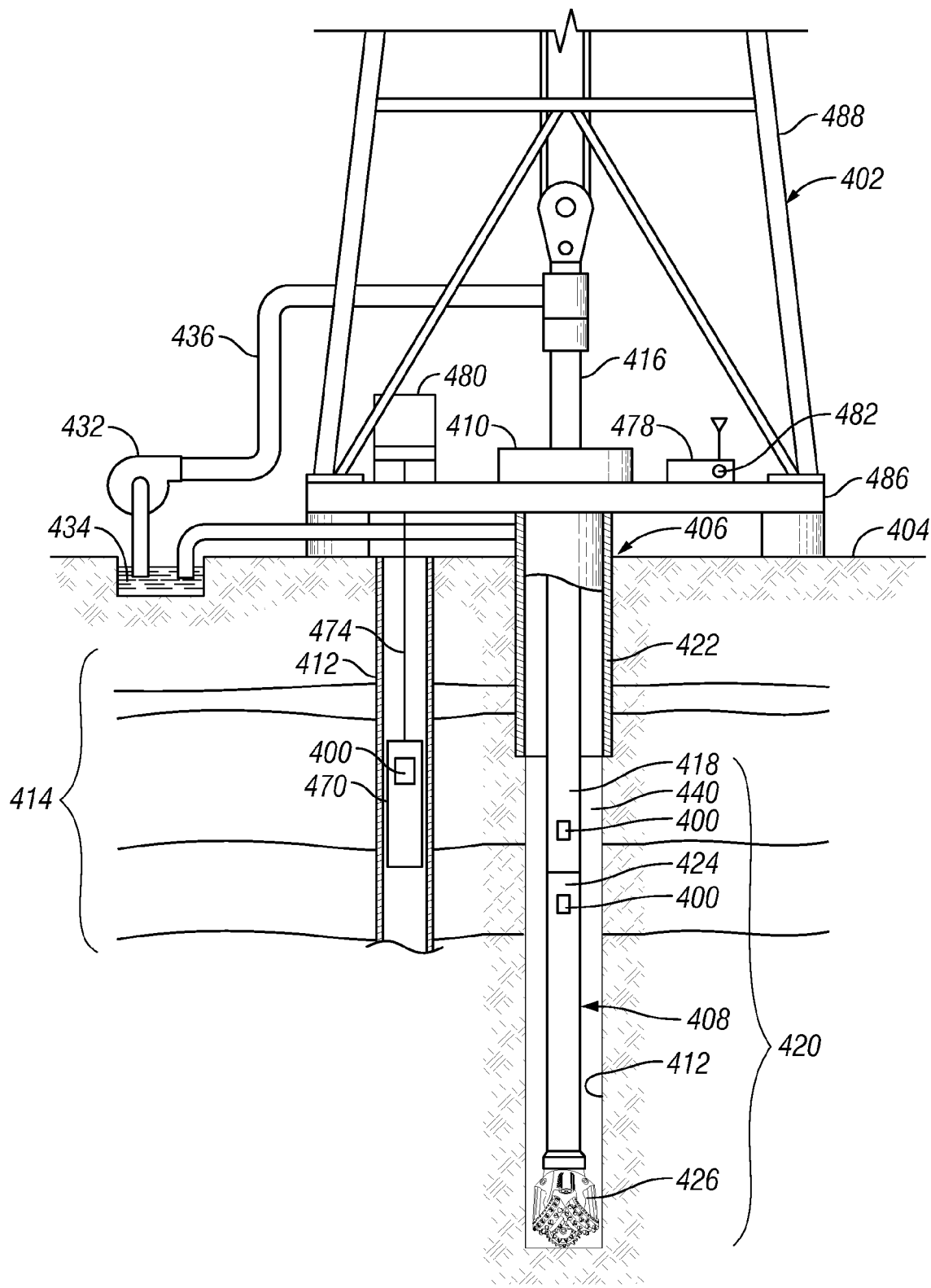
FIG. 3 illustrates a drilling well during Measurement While Drilling (MWD) operations, Logging While Drilling (LWD) operations or Surface Data Logging (SDL) operations, according to some embodiments.

Wellsite operating environments, according to some embodiments in which the above-described measurement techniques and systems can be used, are now described. FIG. 3 illustrates a drilling well during Measurement While Drilling (MWD) operations, Logging While Drilling (LWD) operations or Surface Data Logging (SDL) operations, according to some embodiments. It can be seen how a system may also form a portion of a drilling rig 402 located at a surface 404 of a well 406. The drilling rig 402 may provide support for a drill string 408. The drill string 408 may operate to penetrate a rotary table 410 for drilling a borehole 412 through subsurface formations 414. The drill string 408 may include a Kelly 416, drill pipe 418, and a bottom hole assembly 420, perhaps located at the lower portion of the drill pipe 418.

The bottom hole assembly 420 may include drill collars 422, a downhole tool 424, and a drill bit 426. The drill bit 426 may operate to create a borehole 412 by penetrating the surface 404 and subsurface formations 414. The downhole tool 424 may comprise any of a number of different types of tools including MWD (measurement while drilling) tools, LWD (logging while drilling) tools, and others.

During drilling operations, the drill string 408 (perhaps including the Kelly 416, the drill pipe 418, and the bottom hole assembly 420) may be rotated by the rotary table 410. In addition to, or alternatively, the bottom hole assembly 420 may also be rotated by a motor (e.g., a mud motor) that is located downhole. The drill collars 422 may be used to add weight to the drill bit 426. The drill collars 422 also may stiffen the bottom hole assembly 420 to allow the bottom hole assembly 420 to transfer the added weight to the drill bit 426, and in turn, assist the drill bit 426 in penetrating the surface 404 and subsurface formations 414.

During drilling operations, a mud pump 432 may pump drilling fluid (sometimes known by those of skill in the art as "drilling mud") from a mud pit 434 through a hose 436 into the drill pipe 418 and down to the drill bit 426. The drilling fluid can flow out from the drill bit 426 and be returned to the surface 404 through an annular area 440 between the drill pipe 418 and the sides of the borehole 412. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation 414 cuttings created by operating the drill bit 426.

Figure 4:
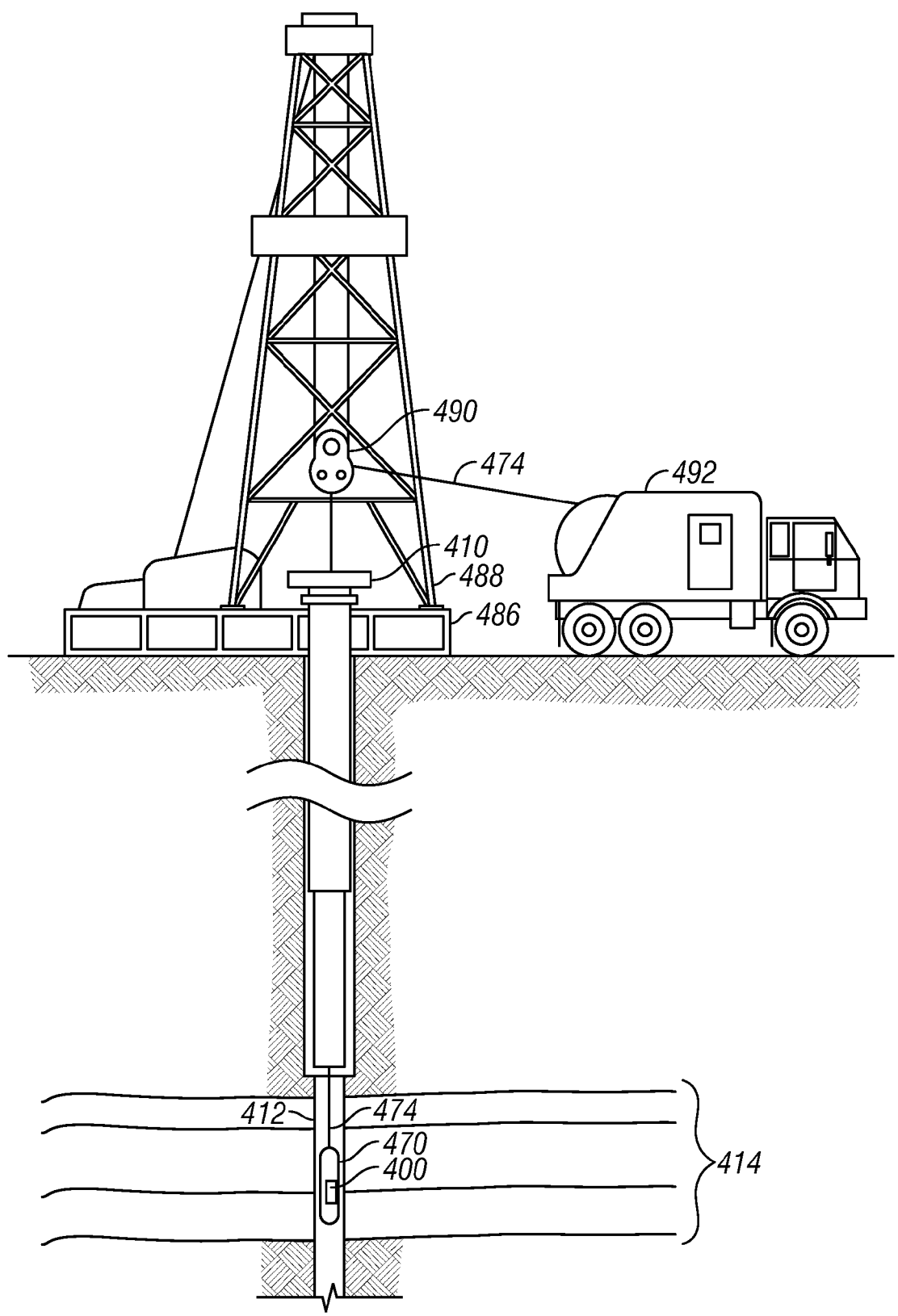
FIG. 4 illustrates a drilling well during wireline logging operations, according to some embodiments.

FIG. 4 illustrates a drilling well during wireline logging operations, according to some embodiments. A drilling platform 486 is equipped with a derrick 488 that supports a hoist 490. Drilling of oil and gas wells is commonly carried out by a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the tool body 470 is lowered to the bottom of the region of interest and subsequently pulled upward at a substantially constant speed. During the upward trip, instruments included in the tool body 470 may be used to perform measurements on the subsurface formations 414 adjacent the borehole 412 as they pass by. The measurement data can be communicated to a logging facility 492 for storage, processing, and analysis. The logging facility 492 may be provided with electronic equipment for various types of signal processing. Similar log data may be gathered and analyzed during drilling operations (e.g., during Logging While Drilling, or LWD operations).

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

The cooling system has scalability. To increase the cooling power of the system, the flow rate of water released from the high pressure tank is increased. To extend the operating range of the system, the volume of the container can be increased. Furthermore, the final temperature provided by the system can be varied of a wide range by changing the flashing or low pressure value.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

What is claimed is:

1. A downhole tool comprising:
   an elongate tool string;
   a container disposed within the tool string, the container to house a pressurized refrigerant therein;
   a tank in fluid communication with the container;
   a heat exchanger associated with the tank, wherein the heat exchanger is to exchange heat between the refrigerant and a downhole payload; and
   a venturi located proximate to the container to create a low pressure region adjacent the tank when fluid flows through the venturi.

2. The tool as recited in claim 1, wherein the venturi has a drilling mud passage therethrough, the drilling mud passage having a first portion and a second portion, and a convergence between the first portion and the second portion, wherein the fluid comprising drilling mud flowing through the convergence creates the low pressure region.

3. The tool as recited in claim 1, wherein the container is pre-pressurized.

4. The tool as recited in claim 1, wherein the pressure within the container is to be maintained by downhole pressure.

5. The tool as recited in claim 1, wherein the pressure within the container is to be maintained by drilling mud flow.

6. The tool as recited in claim 1, wherein the refrigerant comprises water.

7. The tool as recited in claim 1, further comprising a check valve associated with the container.

8. The tool as recited in claim 1, further comprising an actuator associated with the output of the container.

9. The tool as recited in claim 1, wherein the downhole tool forms part of a drill string.

10. The tool as recited in claim 1, wherein the downhole tool is a wireline tool.

11. A method comprising:
    pressurizing a container having refrigerant therein to provide a pressurized container;
    disposing the pressurized container within a downhole tool string;
    disposing the downhole tool string within a wellbore,
    maintaining pressure of the pressurized container; and
    cooling a payload of the downhole tool string to a temperature lower than downhole ambient temperature by exchanging heat between the payload and the refrigerant, and by flowing drilling mud at a reduced pressure proximate to the container to flash the refrigerant to a pressure that drops a temperature of the refrigerant below the downhole ambient temperature.

12. The method as recited in claim 11, wherein pressurizing the container occurs prior to disposing the downhole tool string within the wellbore.

13. The method as recited in claim 11, wherein pressure of the drilling mud is reduced at a convergence of a venturi, the convergence located near the container.

14. The method as recited in claim 11, further comprising disposing water as the refrigerant in the container.

15. The method as recited in claim 11, wherein maintaining pressure of the pressurized container includes maintaining pressure with downhole pressure.

16. The method as recited in claim 11, wherein maintaining pressure of the pressurized container includes maintaining pressure with drilling mud flow.

17. The method as recited in claim 11, wherein maintaining pressure of the pressurized container includes displacing at least one of a piston, a spring, or a bellows with downhole pressure.

18. The method as recited in claim 11, further comprising operating a regulator when the temperature of the refrigerant is at or greater than the downhole ambient temperature.

19. The method as recited in claim 11, further comprising releasing the refrigerant to an upper surface portion of the wellbore.

20. The method as recited in claim 11, further comprising sensing a temperature of the payload, and releasing the refrigerant based on a temperature of devices in the payload.

21. The method as recited in claim 11, further comprising controlling flow from the pressurized container including flowing the refrigerant through an orifice.

\* \* \* \* \*